US007985938B2

(12) United States Patent
Johnson

(10) Patent No.: US 7,985,938 B2
(45) Date of Patent: Jul. 26, 2011

(54) METHOD OF SORTING USED TUBULAR GOODS PRIOR TO RECLAIMING OR RECONDITIONING

(75) Inventor: Donald Mike Johnson, The Woodlands, TX (US)

(73) Assignee: TRC Services, Inc., The Woodlands, TX (US)

( * ) Notice: Subject to any disclaimer, the term of this patent is extended or adjusted under 35 U.S.C. 154(b) by 342 days.

(21) Appl. No.: 12/244,931

(22) Filed: Oct. 3, 2008

(65) Prior Publication Data

US 2010/0084322 A1 Apr. 8, 2010

(51) Int. Cl.
*B07C 5/34* (2006.01)
*G01N 27/82* (2006.01)

(52) U.S. Cl. ......... 209/567; 209/518; 209/570; 324/240

(58) Field of Classification Search .................. 209/518, 209/521, 555, 567, 570, 590; 324/240
See application file for complete search history.

(56) References Cited

U.S. PATENT DOCUMENTS 3,958,049 A 5/1976 Payne
4,045,591 A * 8/1977 Payne ........................... 427/455
4,494,607 A 1/1985 Ford et al.
5,581,037 A * 12/1996 Kwun et al. .................... 73/623
5,793,205 A * 8/1998 Griffith et al. ................ 324/238
6,566,871 B2 * 5/2003 Holzl ............................ 324/240
6,580,268 B2 6/2003 Wolodko

OTHER PUBLICATIONS

NOV Tuboscope,“Sucker Rods”, Internet web pages from NOV Tuboscope web site, Jan. 6, 2009, pp. 1-2, accessed Jan. 6, 2009 at http://www.nov.com/Products.aspx?Puid=wKMJboDA1se9oD&nodeld=ZVWPND7XXHVMCF2O52MTZKTUKPA.

Rod Services, “Sucker Rod Inspection”, Internet web page form Rod Services web site, Oct. 2, 2008, p. 1, accessed Oct. 2, 2008 at http://www.rodservices.com/services/rodservices/.

PRO operation flowchart, “pro operation flowchart”, Internet web pages form Permian Rod Operations web site, Oct. 2, 2008, pp. 1-2, accessed Oct. 2, 2008 at http://www.permianrod.com/prolib/flow-chart.htm.

* cited by examiner

*Primary Examiner* — Joseph C Rodriguez
(74) *Attorney, Agent, or Firm* — Jeffrey L. Wendt

(57) ABSTRACT

Methods for reclaiming or reconditioning used tubulars are disclosed. One method includes performing non-visual, non-destructive inspection of used tubulars at a site of a reconditioning or reclaiming plant prior to the used tubulars being cleaned in preparation for reclaiming or reconditioning, followed by sorting the used tubulars based principally on the inspection. The non-visual, non-destructive inspection may be selected from magnetic flux leakage inspection, ultrasonic inspection, Eddy current inspection, acoustic emission inspection, and combinations thereof.

12 Claims, 3 Drawing Sheets

METHOD OF SORTING USED TUBULAR GOODS PRIOR TO RECLAIMING OR RECONDITIONING

BACKGROUND INFORMATION

1. Technical Field

The present disclosure relates generally to the field of inspection and reconditioning of tubular goods such as sucker rods, and more specifically to methods of sorting used tubular goods prior to exposing the goods to reconditioning processes.

2. Background Art

Sucker rod is used as an example in the following discussion, but the methods are applicable to other tubular goods, such as production tubing, line pipe, and the like. It is assumed the reader is familiar with sucker rods and their use. As will be noted, the process involves many steps and it is an object of the present disclosure to pre-sort the rods so that only those rods worthy of returning to use are subjected to all of the steps.

Figure 1:
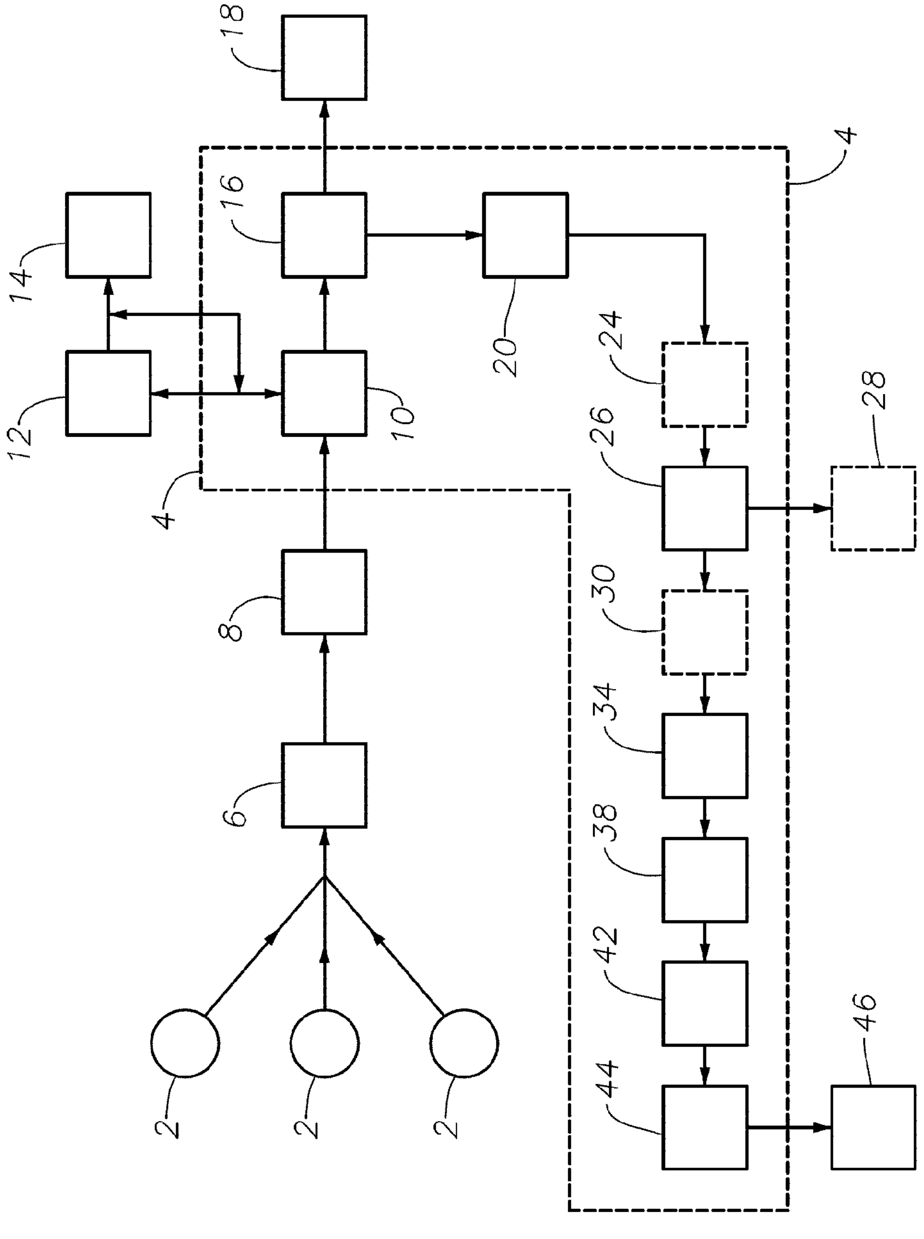
Fig. 1 (Prior Art)

Referring to FIG. 1, in convention methods, at a well site 2 or other site where used sucker rod is to be picked up for reclaiming or reconditioning (the difference between reclaiming and reconditioning is explained below), rods are loaded onto trucks using support stripping to prevent bending. In areas where multiple wells 2 are to be picked up, within short distance of a reconditioning plant, truck trailers having specially developed cranes may be used. After the used rods arrive at a plant 4 (indicated by dashed line box) they are lifted to a holding area 6 where they are uniquely identified according to size, quantity, company name and well location and tagged appropriately. This identity is maintained throughout the entire inspection and reconditioning process. In conventional methods, all used rods are then dipped in a hot kerosene bath 8 to remove paraffin, grease and other foreign materials. Once the used rods are clean, they are normally all moved into the plant 4, where the reconditioning or reclaiming process begins.

Visual inspection 10 is the first step in the convention reclamation and reconditioning processes. Visual inspection involves a human visually locating pitting, corrosion, wear, stretched rods and bent rods. Any rod failing to pass this visual inspection is temporarily removed from the plant. Any rods that are bent, bowed, or have rod guides on them are removed and sent to a rod straightening machine 12 and/or a rod guide removal machine 14. Once they are straight and have the rod guide removed, they are all returned to the plant 4 for the reconditioning or reclaiming process. From experience, one might surmise that some of these straightened and cleaned used rods might have unseen defects (cracks, for example), and that some of these defects may in fact make those rods unacceptable for their intended field use, but all the rods are nevertheless processed in the plant until a defect is found. In a typical plant 4, the next step 16 is for all couplings to be removed; in some cases this may be accomplished with a specially designed hydraulic device. Pin end areas are buffed and cleaned to parent metal. Once the pins are cleaned they are inspected and gauged. Any rod that is rejected in step 16 is removed from plant 4, as indicated by box 18, only after much effort and expense.

In reclaiming or reconditioning used sucker rod, rust, scale and other surface materials are removed by shot cleaning or shot peening 20. Shot peening defines reconditioning as opposed to simply reclaiming rods. Shot peening has been shown to increase the life of used rod from 50 to 100 percent. After exiting the shot cleaner or shot peener 20 the rod may pass through a magnetic normalizing device 24. Typically, used rods have a residual magnetic field in the body of the rod. This magnetic field is not consistent within the lot to be reconditioned. The magnetic inconsistency has a dramatic effect on Eddy Current inspection, causing inaccurate results. By creating a consistent magnetic field in the rod prior to Eddy Current inspection, consistent, reliable inspection results are achieved. Magnetic normalization increases the likelihood of flaw detection, and thereby greatly reduces the likelihood of a sucker rod failure caused by localized stress, fatigue, and improper normalization of the upset run out. Once the rod is either shot cleaned or shot peened, and after any magnetic normalization, it is full length inspected by an Eddy Current Device 26. This device identifies fatigue, embrittlement and irregular normalizing in the rod body. In some plants, any rejected rods are removed from plant 4, as indicated at box 28. It should be mentioned here that the use of symbols (boxes, circles, etc.) in the various figures is completely arbitrary unless specifically pointed out. Dashed boxes indicate optional processes, or processes that some plants may not practice.

Depending on the particular plant, rods to be further reclaimed or reconditioned may then progress into a rotating laser measurement unit 30 where the entire rod may be examined to determine if it is within diameter specifications. Rods to be further reclaimed or reconditioned then are passed into an EMI (electromagnetic inspection) unit 34 where injurious pits and cracks are identified. End areas of rods that remain acceptable are subjected to wet magnetic particle inspection, as indicated by box 38. Wet magnetic particle inspection detects cracks in the thread area, undercut area, wrench flat area, upset, and transition area. Liberal amounts of corrosion inhibitor lubricant and a new protector is applied to end areas of rods that remain acceptable after end area inspection station 38. The sucker rod is then run through a device 42 that removes the residual magnetic field in the rod that was induced for inspection purposes to an acceptable level. An amine-based corrosion inhibitor is typically applied at station 44, which will provide corrosion protection during storage, and approximately two weeks downhole protection. Each rod is color coded as to the final grade of the reclaimed or reconditioned rod. After the rod has been coded, it is removed from the plant 4 and placed into storage 46 for inventory control.

As noted, both reclaiming and reconditioning processes involve many steps, materials, manpower, and plant space. Most plants have no or minimal ways of getting rejects out of the plant that fail. This is a real problem addressed by the present disclosure; if rejects could be denied entry to the plant, then all of the processes being performed in the plant would be performed on acceptable material and not substandard material. These processes cost money and if the money is only being spent on acceptable products, then that is the most cost effective manner in which to operate the plant. This is an important issue; in many instances the ability to remove a product at the point of rejection in a reclamation or reconditioning plant is materially overstated. A problem with both reconditioning and reclaiming sucker rods and other tubulars is that the visual inspection 10 is not reliable and often fails to identify tubulars that are ultimately, after passing through many of the above-described steps, rejected. The result is a waste of time, materials, and plant space for those rods that are ultimately rejected.

The industry has long lived with the above-mentioned problem and has accepted it as a fact of the business. There is thus a long-felt but as yet unmet need in the art of reconditioning and reclaiming tubulars, and in particular sucker rod, for an effective method of solving this problem.

SUMMARY

In accordance with the present disclosure, methods are described that reduce or overcome at least the above-described problem in previously known tubular reclaiming and reconditioning methods.

One aspect of the present disclosure is a method of reclaiming or reconditioning used tubulars, comprising:

performing non-visual, non-destructive inspection of used tubulars at a site of a reconditioning or reclaiming plant prior to the used tubulars being cleaned in preparation for reclaiming or reconditioning, and sorting the used tubulars based principally on the inspection.

As used herein, "sorting" means to arrange according to class, kind, and/or size; to classify. The classes are at least two; acceptable and rejected. Sorting may or may not include one or more acts of physically separating used tubulars into two or more categories or groups, such as by using a crane or some other lifting apparatus. In certain methods in accordance with this disclosure, sorting comprises sorting the used tubulars into an acceptable category and a rejected category based principally on the inspection, and is followed by reconditioning or reclaiming used tubulars only in the acceptable category. The phrase "based principally on" means that some used tubulars in a particular group may appear visually to be acceptable (for example using the conventional human visual inspection technique), but these used tubulars then must also be acceptable using the non-visual, non-destructive inspection. In other words, "based principally on" means that, while some used tubulars may appear to a human to be acceptable, the sorting into acceptable and rejected used tubulars must also pass objective testing, and not just subjective testing, before the used tubular is even allowed to be cleaned and further reclaimed or reconditioned. In certain other methods, sorting is based on results consisting essentially of results of one or more non-visual, non-destructive inspection steps or sub-methods. The phrases "consist essentially" and "consisting essentially" of results from one or more non-visual, non-destructive inspections means the separation into acceptable and rejected categories is performed chiefly by non-visual, non-destructive inspection, while a certain number of used tubulars may be rejected by human vision review. For example, a used tubular may be split, stretched or otherwise so extremely damaged that non-visual, non-destructive inspection is not required to reject the tubular. It will be understood that the non-visual, non-destructive inspection may include one or more steps or types of non-visual, non-destructive inspection, such as magnetic flux leakage inspection followed by Eddy Current inspection.

A "tubular" may include hollow or solid tubulars, continuous tubulars or joints, and includes welded, flanged, screwed, and other tubular goods. Sucker rod joints are one type of tubular which may benefit from the methods described herein, but the disclosure is not so limited. As used herein, the term "used tubular" means a tubular that has been in actual service for a purpose, such as transporting fluids, connecting a downhole pump to a surface driver, and the like, whether on the surface, downhole, underwater, on-shore, or off-shore. In the case of sucker rods, used sucker rods are those that may be lifted to a holding area where they are uniquely identified according to size, quantity, company name and well location and tagged appropriately, but are not dipped in a hot kerosene bath to remove paraffin, grease and other foreign materials.

As used herein the phrase "performing non-visual, non-destructive inspection" means a technique which does not impair the tubulars from performing their intended function or use, and does not involve a human visual test. Examples of suitable non-visual, non-destructive inspections include, but are not limited to, magnetic flux leakage inspection, ultrasonic inspection, Eddy current inspection, acoustic emission inspection, and the like. It is understood that data from such tests may be presented in one or more formats, including visual format, such as on a CRT screen, flat panel screen, printer, strip chart recorder and the like.

Methods of the disclosure will become more apparent upon review of the brief description of the drawings, the detailed description of the disclosure, and the claims that follow.

BRIEF DESCRIPTION OF THE DUSEDINGS

Figure 2:
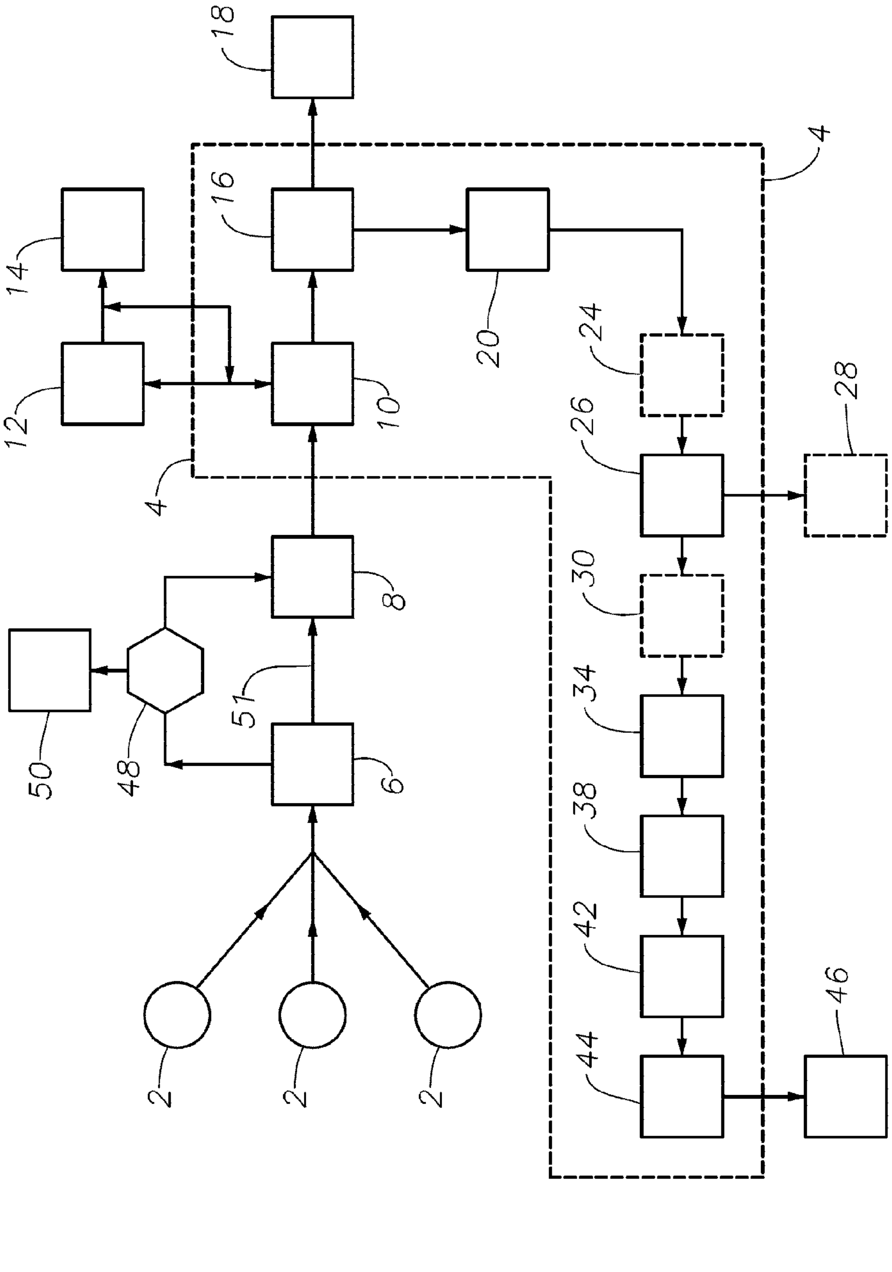
Figure 3:
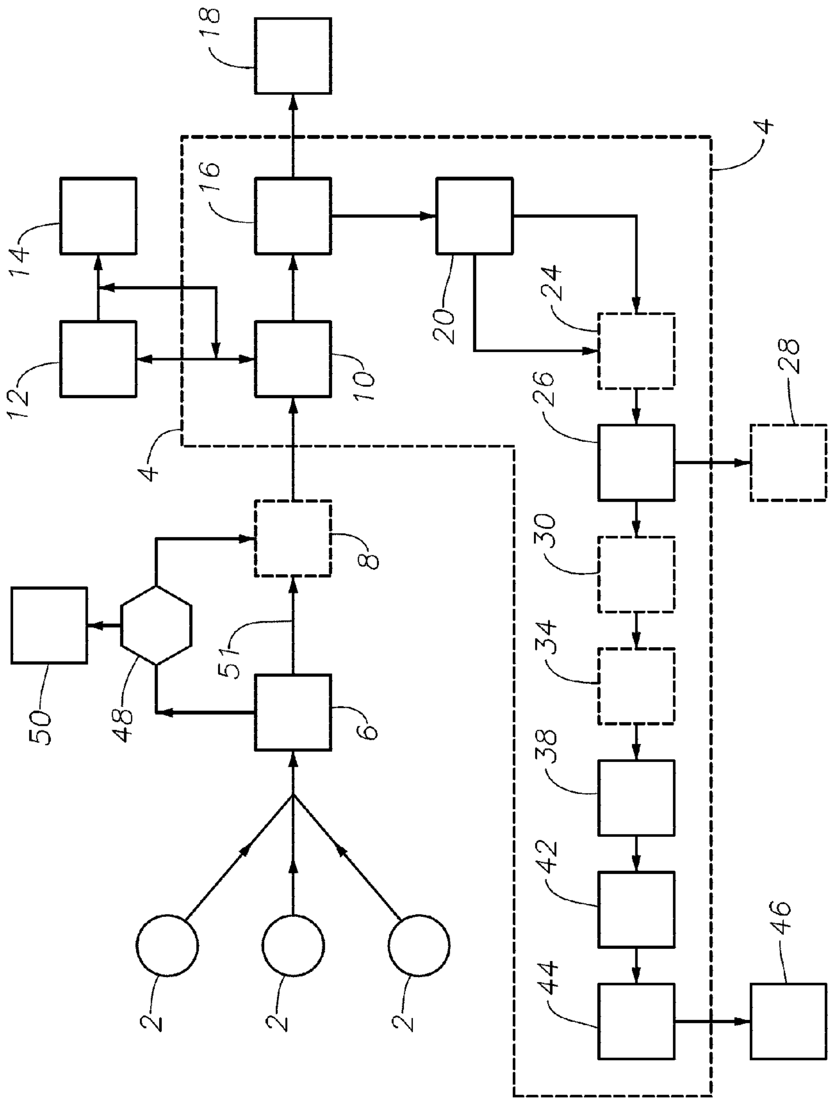

The manner in which the objectives of the disclosure and other desirable characteristics can be obtained is explained in the following description and attached drawings in which:

FIGS. 1 is a schematic flow chart of a prior art reclamation or reconditioning process; and FIGS. 2 and 3 are schematic flow charts illustrating two methods in accordance with the present disclosure.

DETAILED DESCRIPTION

In the following description, numerous details are set forth to provide an understanding of the present disclosure. However, it will be understood by those skilled in the art that the present disclosure may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romantic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The present disclosure is directed toward solving or alleviating a problem in reclaiming or reconditioning used tubulars, such as used sucker rods. The problem, as explained previously, is that human visual inspection is not able to efficiently, effectively, and consistently identify which used tubulars have defects prior to the used tubular being fully or almost fully processed in the reclaiming or reconditioning plant.

Methods of the present disclosure address this problem by sorting the used tubulars prior to their entrance into the reclamation or reconditioning process, prior to their undergoing most or all of the steps in such a plant, thus avoiding the expense of processing a product which will not perform its intended use. The methods are explained more fully in the paragraphs which follow.

In certain embodiments the methods of the disclosure comprise performing non-visual, non-destructive inspection of used tubulars at a site of a reconditioning or reclaiming plant prior to the used tubulars being cleaned in preparation for reclaiming or reconditioning in the plant, and sorting the used tubulars based principally on the inspection.

FIG. 2 illustrates one method embodiment in accordance with the present disclosure. Used sucker rods are again used as an example, it being understood that other used tubulars may benefit from the methods of the present disclosure. Used sucker rods are gathered from one or more sites 2, as in the prior art method illustrated in FIG. 1. As in the known methods, after the used rods arrive at a plant 4 (indicated by dashed line box) they may be lifted to a holding area 6 where they may be uniquely identified according to size, quantity, company name and well location and tagged appropriately, although these steps are not strictly required to practice the methods of the present disclosure. This identity may be maintained throughout the entire inspection and reconditioning process, as in the prior art method.

In contrast to the conventional process, all rods then pass to a station 48 where non-visual, non-destructive inspection of all used rods is carried out, except those that are obviously unfit for re-use, which may be discarded. More than one non-visual, non-destructive inspection station 48 may be employed. Used rods that are unacceptable in accordance with the particular standards demanded by the non-visual, non-destructive inspection are sorted into acceptable and rejected categories, and the rejected rods may be removed from the reclamation or reconditioning process at 50. As will be recognized, this greatly increases the number of acceptable used rods that will pass through the reclamation or reconditioning plant 4. As in conventional methods, all used rods may then be dipped in a hot kerosene bath 8 to remove paraffin, grease and other foreign materials. Once the used rods are clean, they are normally all moved into the plant 4, where the reconditioning or reclaiming process begins. In this embodiment, the remainder of the steps illustrated in FIG. 2 are the same as in FIG. 1. Note that methods in accordance with the disclosure allow used tubulars to be processed by the previously known methods, as indicated by dashed line 51 between boxes 6 and 8, should the non-visual, non-destructive test facility 48 be taken out of service for some reason.

In other embodiments, as there has been an initial non-destructive test prior to the used rods entering plant 4, there may be less need for one or more process steps that normally occur in the conventional process. For example, in the embodiment illustrated in FIG. 3, one or more of dipping in oil (8), magnetic normalizing (24), laser diameter measurement (30), rod removal (28), and electromagnetic inspection (34) may be optional, as indicated by the dashed line boxes in FIG. 3.

Used sucker rod joints are one type of used tubular which may benefit from the methods described herein. The methods of the present disclosure may produce a variety of reclaimed or reconditioned sucker rods. For example, a #1 reconditioned sucker rod has no visible wear, no cracks, and pitting no greater than 0.020 inch (0.05 cm) depth may be present. The #1 reconditioned sucker rod has design and application ratings of 100 percent of a new sucker rod. A #2 reconditioned sucker rod has visible wear not exceeding 20 percent of the cross-sectional area, pitting no greater than 0.040 inch (0.1 cm) depth may be present, no cracks, and has design and application ratings at 65 percent of new sucker rods.

As noted herein, shot peening is different from, and accomplishes different results, than shot blasting (cleaning). Shot peening is a cold working process in which the surface is bombarded with small spherical media called shot. As each individual shot particle strikes the surface, it produces a slight rounded depression. Plastic flow and radial stretching of the surface metal occur at the instant of contact and the edges of the depression rise slightly above the original surface. Benefits obtained by shot peening are the result of the effect of the compressive stress and the cold working induced. Compressive stresses are beneficial in increasing resistance to fatigue failures, corrosion fatigue, stress corrosion cracking, and hydrogen assisted cracking (Hydrogen Embrittlement). Shot peening is effective in reducing sucker rod fatigue failures caused by cyclic loading. Stress corrosion cracking cannot occur in an area of compressive stress. The compressive stresses induced by shot peening can effectively overcome the surface tensile stresses that cause stress corrosion. Shot peening has been shown to be effective in retarding the migration of hydrogen through metal. Shot peening improves the surface integrity of the sucker rod. As peening cold-works the rod surface, it blends small surface imperfections and effectively eliminates them as stress concentration points.

One of the inspection stations 48 may include a normalization station for the tubulars designated as acceptable after the initial non-visual, nondestructive inspection. By normalizing the magnetic properties of sucker rods prior to directing them through an energized eddy current test coil, the induced eddy current field is greatly intensified by any permeability changes in the rod. If the magnetic field strength produced by the eddy current test coil varies even slightly, these small variations have a large effect on the impedance of the coil. And, they are often very large in comparison to the changes caused by changes in conductivity or dimension. Permeability is described as the ease with which a material can be magnetized. For non-ferrous metals such as copper, brass and aluminum, the permeability is the same as that of "free space." In other words, the relative permeability (mr) is one. For ferrous metals, however, the value of mr may be several hundred, and this has a significant influence on eddy current response. In addition, permeability will vary greatly within a metal part due to localized stresses, heating effects, and other factors. Permeability will vary in a used sucker rod due to handling and bending (localized stresses), fatigue (cyclic loading), and improper normalization in the upset runout (heating effects). When an energized eddy current test coil is placed on non-magnetized ferromagnetic material, the field is greatly intensified by the magnetic properties of the material so that a large change in the impedance of the test coil occurs. If the magnetic field strength at various locations varies even slightly, these small variations have a large effect on the impedance of the coil. These changes in the impedance of the coil are often so large (in comparison to the changes caused by changes in conductivity or dimension) that they mask all other changes. The process for normalizing the magnetic properties of a sucker rod prior to eddy current inspection may comprise the following steps: the sucker rod is conveyed through a magnetizing coil with the power supply adjusted such that the sucker rod is magnetized to or near saturation with a longitudinally oriented magnetic field. The magnetized sucker rod is subsequently conveyed through a demagnetizing coil with the power supply adjusted such that the magnetic field induced by the magnetizing coil is reversed and reduced to a near zero gauss level. Following this normalization process, the sucker rod will contain a minimal strength, longitudinal, magnetic field that is consistent throughout the length of the sucker rod, with the exception of those areas of varying permeability caused by localized stress, fatigue, improper normalization of the upset runout, and the like.

Methods of the disclosure that employ magnetic flux leakage inspection as one or more inspections represented at 48 in FIGS. 2 and 3 may include sliding one or more magnetic sensors on (or a certain distance above) the used tubular. In certain methods of the disclosure, the sensing includes adjusting the distance of a bottom surface of the sensor elements from the used tubulars during sensing. When the non-visual, non-destructive inspection is magnetic flux leakage inspection, the inspection may comprise setting up a transverse magnetic field in the used tubular and sensing leakage of magnetic flux from substantially longitudinal defects in the used tubular. Alternatively, when the non-visual, non-destructive inspection is magnetic flux leakage inspection, the inspection may comprise setting up a longitudinal magnetic field in the used tubular and sensing leakage of magnetic flux from substantially transverse defects in the used tubular.

Methods of the disclosure may be employed by passing used tubulars through one or more stationary inspection stations 48, or one or more inspection apparatus 48 may be moved along stationary tubulars. Indeed, both the used tubulars and inspection apparatus may move, as long as there is relative movement between them effective to perform the inspection. This pertains to all forms of non-visual, non-destructive inspection. Magnetic flux leakage inspection systems known in the art may be used in methods of the disclosure, such as that disclosed in U.S Pat. No. 7,397,238, assigned to Scan Systems, Corp., incorporated herein by reference in its entirety. The '238 patent describes tubular member inspection apparatus comprising a frame; a magnetic coil and a detector assembly supported by the frame; the frame, magnetic coil, and detector assembly each having inlet and outlet openings for passing a tubular member there through, the detector assembly having one or more magnetic detectors adapted to be spaced a first distance from the tubular member by one or more substantially frictionless members during an inspection. Apparatus of the '238 patent may comprise an actuator assembly comprising sensors adapted to sense wide portions of the tubular member and direct one or more actuators in the detector assembly to retract the detectors away from the tubular member a second distance greater than the first distance. Apparatus of the '238 patent include those wherein the first distance is at least 0.030 inch (0.076 cm), and those apparatus wherein the first distance ranges from about 0.050 inch (0.127 cm) up to about 0.5 inch (1.27 cm). Other apparatus of the '238 patent are those wherein the detector assembly comprises a plurality of detector support sub-assemblies. While the '238 patent is not so limited, each detector support sub-assembly may comprise a primary and a secondary support member and one of the actuators, the primary support member adapted to support the one or more magnetic detectors, the primary support member moveably connected to the secondary support member through a dual linkage. The dual linkage may allow the detectors to move substantially parallel to the tubular member when retracting away from and toward the tubular member. Other apparatus of the '238 patent are those wherein the first distance is maintained by one or more precision rollers held in each primary support, and those wherein each actuator is the same or different and selected from pneumatic, hydraulic, and electronic actuators. The dual linkage may comprise first and second links, each link having first and second ends, the first ends individually connected to the primary support member at first and second connections, and the second ends individually connected to the second support member at third and fourth connections. The connections allow pivot movement between the links and the support members. Apparatus of the '238 patent allow movement of the detectors away from the tubular member being inspected, the second distance being sufficient to avoid damage to the detectors. The sensors of the actuator assembly may comprise a first rotating member riding on the tubular member upstream of the detector assembly and a second rotating member riding on the tubular member downstream of the detector assembly. Alternatively, the sensors of the actuator assembly may be optical sensors. The plurality of detector support sub-assemblies may comprise alternating outer detector support sub-assemblies and inner detector support sub-assemblies, wherein the outer detector support sub-assemblies each support a transverse magnetic detector and a wall thickness detector. This arrangement of inner and outer detector support sub-assemblies (creating what is sometimes referred to herein as a "dual ring" of detectors) is one possible arrangement, allowing the detectors to monitor magnetic flux lines that, together, will cover more than 360 degrees of the circumference of the tubular member, therefore guaranteeing 100 percent inspection, and thus the ability to detect defects in tubular members. However, all detector sub-assemblies may be identical and provide for a single ring of detectors around the tubular member during inspection. The latter arrangement may not find a defect if it exists in between the detectors, and cannot therefore guarantee full 100 percent coverage of the tubular member, and may be less sensitive in detecting defects than dual ring embodiments, however it is still quite sensitive and experience users will find the unit useful. The magnetic detectors may be selected from Hall elements, magneto diodes, magneto resistors, and the like, although the '238 patent is not so limited. The inner detector support sub-assemblies may each support a transverse magnetic detector, and these may also be selected from Hall elements, magneto diodes, magneto resistors, and the like. The actuator assembly may comprise first and second valves, the first valve positioned upstream of the detector assembly and the second valve positioned downstream of the detector assembly. In certain embodiments the first and second valves are each spring-loaded, and each valve may comprise a pressurized fluid inlet and a bleed fluid exhaust outlet, wherein the fluid may be air, nitrogen, hydraulic fluid, or some other fluid, although air is generally available at lower cost. The sensors may be mounted on slide mechanisms adapted to slide into a position allowing a lever to bleed the fluid through the bleed fluid exhaust outlet when a wide portion of tubular member is sensed by one of the sensors. The valves may be adapted to allow pressurized fluid into the actuators when the sensors do not sense a wide portion of tubular member. These embodiments may include an electronic circuit or pneumatic means to synchronize the resetting of the fluid pressure in the actuators after the wide portion of tubular member has passed by the detectors and when the second sensor is reached. In certain embodiments, the frame may include an end piece having a curved profile, allowing the apparatus to be tilted when inspecting vertical tubular members. The '238 patent also describes magnetic detector and support sub-assemblies comprising a primary support member; a magnetic detector supported by the primary support member; a secondary support member; and an actuator, wherein the primary support member is moveably connected to the secondary support member through a dual linkage and the actuator, the dual linkage allowing the detector to be positioned substantially parallel to a material being inspected when moved away from and toward the material by action of the actuator. The '238 patent also describes methods of inspecting a tubular member, in general comprising passing a tubular member through an apparatus as described in the '238 patent, and comprising detecting variations in the magnetic field produced by defects in the tubular member, the detector assembly having one or more magnetic detectors spaced a first distance from the tubular member by one or more substantially frictionless members during inspection. Optionally, methods of the '238 patent include sensing a wide portion of the tubular member and directing one or more actuators in the detector assembly to retract the detectors away from the tubular member a second distance greater than the first distance. The dual linkage detector assembly is an important feature of apparatus described in the '238 patent. The dual linkage facilitates positioning of the detectors on a substantially parallel axis to the tubular member. Apparatus known previous to the filing of the '238 patent used a single pivot point which did not allow the detectors to be positioned in a precise manner. They were consistently at odd angles and off axis to the center of the tubular member. Another feature of the apparatus described in the '238 patent is the provision of one or more substantially frictionless members, which may be two roller bearings, for each detector carrying arm, to help maintain a precise air gap between the detectors and the tubular member surface. The substantially frictionless members may benefit users of the apparatus in one or more of the following ways: reduced wear of the magnetic detectors, which can save the user time and money; reduced (and in some cases, totally overcome) magnetic noise from the surface of the tubular member; and signal to noise relationships that allow digital electronics to produce better signal processing. The precise air gap means reduced noise from the tubular member surface, and the quality of signals may be completely independent of inspection speed. Digital signal processing software, known under the trade designation Digi-Pro™, available from Scan Systems Corp, Houston, Tex., allows 100 percent of the inspection signal to be digitized and processed within a computer. The computer and digital signal processing software known under the trade designation Digi-Pro™ may utilize a series of virtual printed circuit boards known under the trade designation SimKardz™ to perform the calculations required. Signals may be captured from the detectors and digitized almost immediately, then processed through one or more algorithms to produce large signal to noise ratios. Improvements in signal to noise ratios of at least 20 percent, sometimes at least 100 percent, and in certain embodiments even 200 percent have been seen, compared with existing industry standard equipment.

The methods of the present disclosure allow continued use of components that are familiar to used tubular inspectors and the reclamation/reconditioning industry, while solving a long recognized need in the art that was heretofore largely ignored and simply lived with.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A method for reconditioning used sucker rod, comprising:

performing magnetic flux leakage inspection of used sucker rods at a site of a reconditioning plant prior to the used sucker rods being cleaned;

sorting the used sucker rods into an acceptable category and a rejected category, the sorting based on results consisting essentially of results of the magnetic flux leakage inspection; and reconditioning only the used sucker rods in the acceptable category.

2. The method of claim 1 wherein the sorting comprises physically removing used sucker rods in the rejected category from a group of used sucker rods.

3. The method of claim 1 wherein the reconditioning of used sucker rods in the acceptable category comprises cleaning the used sucker rods, straightening the clean sucker rods, removing rod guides, removing all sucker rod couplings from pin end areas of the sucker rods, buffing and cleaning the end areas to parent metal, and inspecting and gauging the end areas, shot cleaning, shot peening, magnetically normalizing, Eddy current inspecting, diameter inspecting, electromagnetic inspecting, removing residual magnetic fields, applying a corrosion inhibitor, marking for grade and/or identification, and storing.

4. A method for reconditioning used sucker rod, comprising:

performing magnetic flux leakage inspection of used sucker rods at a site of a reconditioning plant prior to the used sucker rods being cleaned, the magnetic flux leakage inspection comprising passing the used sucker rods through an apparatus comprising a frame, a magnetic coil and a detector assembly supported by the frame, the frame, magnetic coil, and detector assembly each having inlet and outlet openings for passing a tubular member there through, the detector assembly having one or more magnetic detectors spaced a first distance from the used sucker rod by one or more substantially frictionless members during inspection, and comprising detecting variations in the magnetic field produced by defects in the used sucker rod;

sorting the used sucker rods into an acceptable category and a rejected category, the sorting based on results consisting essentially of results of the magnetic flux leakage inspection; and reconditioning only the used sucker rods in the acceptable category.

5. The method of claim 4 comprising sensing a wide portion of the tubular member during the magnetic flux leakage inspection and directing one or more actuators in the detector assembly to retract the detectors away from the tubular member a second distance greater than the first distance.

6. The method of claim 4 wherein the sorting comprises physically removing used sucker rods in the rejected category from a group of used sucker rods.

7. The method of claim 4 wherein the sorting comprises marking used sucker rods which do not pass the magnetic flux leakage inspection.

8. The method of claim 4 wherein the reconditioning or reclaiming used sucker rods in the acceptable category comprises cleaning the used sucker rods in the acceptable category to remove paraffin, grease and other foreign materials to form clean sucker rods, and then straightening the clean sucker rods that are bent or bowed to form straightened, clean sucker rods.

9. The method of claim 8 wherein the reconditioning or reclaiming comprises removing rod guides from the straightened clean sucker rods to form non-guided, straightened, clean sucker rods, and returning the non-guided, straightened clean sucker rods to the reconditioning or reclaiming plant.

10. The method of claim 9 comprising removing all sucker rod couplings from pin end areas of the sucker rods, buffing and cleaning the end areas to parent metal, and inspecting and gauging the end areas.

11. The method of claim 9 comprising reclaiming the non-guided, straightened clean sucker rods by, in order:

shot cleaning,
magnetically normalizing,
Eddy current inspecting,
diameter inspecting,
electromagnetic inspecting,
removing residual magnetic fields,
applying a corrosion inhibitor,
marking for grade and/or identification, and
storing.

12. The method of claim 9 comprising reconditioning the non-guided, straightened clean sucker rods by, in order:

shot peening,
magnetically normalizing,
Eddy current inspecting,
diameter inspecting,
electromagnetic inspecting,
removing residual magnetic fields,
applying a corrosion inhibitor,
marking for grade and/or identification, and
storing.

* * * * *